United States Patent
Schrödl

(10) Patent No.: US 6,479,971 B1
(45) Date of Patent: Nov. 12, 2002

(54) METHOD FOR REGULATING A THREE-PHASE MACHINE WITHOUT A MECHANICAL ROTARY TRANSDUCER

(76) Inventor: Manfred Schrödl, Untere Haupstrasse 9, A-7223, Sieggraben (AT)

( * ) Notice: Subject to any disclaimer, the term of this patent is extended or adjusted under 35 U.S.C. 154(b) by 0 days.

(21) Appl. No.: 09/582,636

(22) PCT Filed: Jan. 29, 1999

(86) PCT No.: PCT/AT99/00025

§ 371 (c)(1),
(2), (4) Date: Jul. 28, 2000

(87) PCT Pub. No.: WO99/39430

PCT Pub. Date: Aug. 5, 1999

(30) Foreign Application Priority Data

Jan. 30, 1998 (AT) .............................. 187/98

(51) Int. Cl.[7] .............................. H02H 7/06; H02P 9/00; H02P 11/00; H02P 9/10; H02P 9/04
(52) U.S. Cl. .............................. 322/32; 322/28; 322/22; 322/25; 322/59
(58) Field of Search .............................. 322/32, 31, 20, 322/25; 318/799; 363/41

(56) References Cited

U.S. PATENT DOCUMENTS

| | | | | |
|---|---|---|---|---|
| 3,675,117 A | * | 7/1972 | Reimers | 322/31 |
| 4,085,355 A | * | 4/1978 | Fradella | 318/168 |
| 4,400,655 A | * | 8/1983 | Curtiss et al. | 318/729 |
| 4,695,939 A | * | 9/1987 | Canay | 363/39 |
| 4,763,058 A | * | 8/1988 | Heining et al. | 318/807 |
| 4,908,564 A | * | 3/1990 | Lehle | 318/807 |
| 5,051,680 A | * | 9/1991 | Belanger | 318/701 |
| 5,140,248 A | * | 8/1992 | Rowan et al. | 318/811 |
| 5,309,349 A | * | 5/1994 | Kwan | 363/98 |
| 5,463,301 A | | 10/1995 | Kim | |
| 5,635,811 A | * | 6/1997 | Rebhan et al. | 318/778 |
| 5,684,376 A | * | 11/1997 | Neiger et al. | 318/781 |
| 5,796,235 A | | 8/1998 | Schrodl et al. | |
| 5,798,631 A | * | 8/1998 | Spee et al. | 322/25 |
| 5,811,957 A | * | 9/1998 | Bose et al. | 318/802 |
| 5,867,380 A | * | 2/1999 | Lee | 363/98 |
| 5,955,862 A | * | 9/1999 | Nguyen | 318/801 |
| 5,959,430 A | * | 9/1999 | Yuki et al. | 318/805 |
| 5,969,498 A | * | 10/1999 | Cooke | 318/799 |
| 6,078,162 A | * | 6/2000 | Hohmuth | 318/800 |
| 6,137,258 A | * | 10/2000 | Jansen | 318/802 |

FOREIGN PATENT DOCUMENTS

| | | |
|---|---|---|
| DE | WO502226 A1 * | 3/1991 |
| EP | 0660503 | 6/1995 |
| WO | 92/19038 | 10/1992 |
| WO | 96/23347 | 8/1996 |

OTHER PUBLICATIONS

Manfred Schrödl, VDI Progress Reports, Series 21, No. 117, VDI Verlag, Düsseldorf 1992, "Sensorless Control of A.C. Machines".

* cited by examiner

*Primary Examiner*—Nestor Ramirez
*Assistant Examiner*—Julio C. Gonzalez
(74) *Attorney, Agent, or Firm*—Greenblum & Bernstein, P.L.C.

(57) ABSTRACT

A method is provided for regulating a three-phase machine functioning under any operational conditions without a mechanical rotary transducer. The machine is supplied with D.C. power by an inverter, where parameters of a D.C. link using an actual switching state of the inverter are detected for regulation. The method includes measuring (1) flow direction required for field-oriented control in asynchronous machines, and (2) rotor position for rotor-oriented control in synchronous machines. The measuring is performed by using spatial magnetic conductivity fluctuations in the machine. The conductivity fluctuations are detected using parameters for a D.C. link. An actual switching state of an inverter is used in the measuring process. Mathematical evaluation to calculate flow direction or rotor direction is then performed.

9 Claims, 1 Drawing Sheet

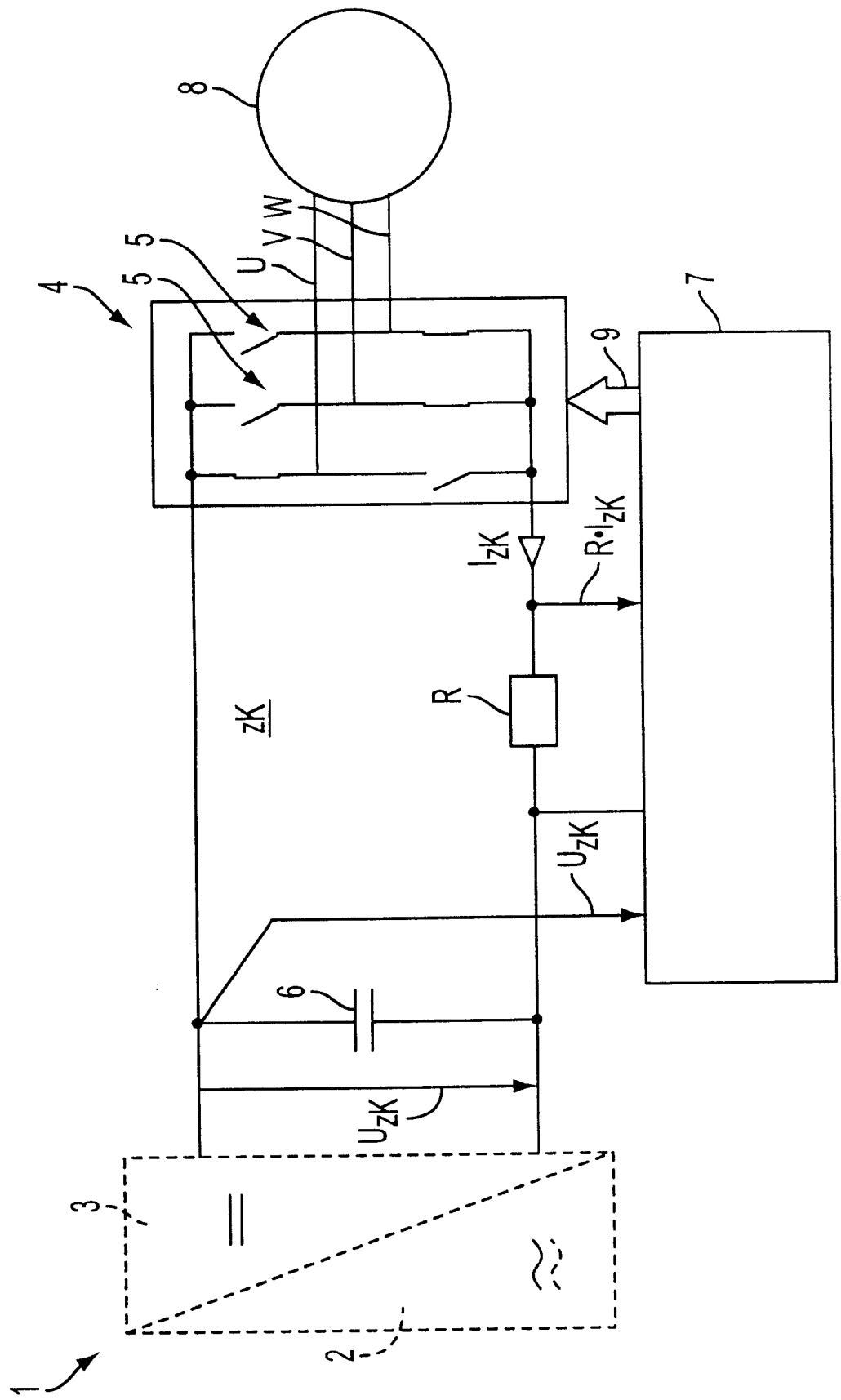

METHOD FOR REGULATING A THREE-PHASE MACHINE WITHOUT A MECHANICAL ROTARY TRANSDUCER

CROSS-REFERENCE TO RELATED APPLICATIONS

This is a U.S. National Stage Application of International Application No. PCT/AT99/00025 filed Jan. 29, 1999 and claims priority under 35 U.S.C. §119 of Austrian Patent Application No. A187/98, filed on Jan. 30, 1998, the disclosure of which is expressly incorporated by reference herein in its entirety.

BACKGROUND OF THE INVENTION

Field of the Invention

The invention relates to a method for regulating a three-phase machine without a mechanical rotary transducer, in particular an asynchronous or synchronous machine, functioning under any operational conditions.

For high-precision regulation of three-phase machines, in particular asynchronous and synchronous machines, the latter either with permanent magnet excitation, through reluctance effect, i.e. different magnetic conductivity depending on the rotor position, or through a combination of permanent magnet excitation and reluctance effect, the position of the magnetic flux is used. For machine speeds above a certain minimum flux rate, the induced electric current (EMC) can be detected by various methods described in the literature, and from it the flux position can be determined. At low flux rates, the flux detection methods based on EMC fail. In this case methods can be used which detect the position or flux density-related magnetic conductivity in real-time, and determine the rotor or flux indicator position from it.

In asynchronous machines, the main magnetic flux in the machine affects the magnetic leakage conductivity through saturation of the metal, so that with real-time measurement of the magnetic leakage conductivity or a related coefficient the flux position can be determined. In synchronous machines, the magnetic flux is directly correlated with the rotor position, so that in synchronous machines the detection of magnetic flux or the detection of the rotor position can be used for field-oriented regulation. In synchronous machines with permanent magnet excitation without a significant reluctance effect, for example when permanent magnets are fixed to a cylindrical rotor, it is possible on saturation in the iron—as with asynchronous machines the saturation-related magnetic conductivity in relation to the flux position—to determine the flux position and also the rotor position using the leakage conductivity in machines with a damper or the main field factor in machines without a damper by means of real-time detection or by detection of a related coefficient. In synchronous machines with reluctance effect, the fluctuating magnetic conductivity depending on the rotor geometry is detected instead of the fluctuating magnetic conductivity depending on the saturation, and thus the rotor position is determined. In synchronous machines with permanent magnet excitation and reluctance effect, the sum effect of the conductivity fluctuation depending on saturation and depending on geometry is used.

As described by M. Schrödl in the VDI Progress Reports, Series 21, No. 117, VDI-Verlag, Düsseldorf 1992, "Sensorless Control of A.C. Machines", by detection of the current space phasor and division by the voltage space phasor a complex value that fluctuates with the double rotor or flux position can be obtained, which delivers the rotor position or the flux position via trigonometric equations. The disadvantage of the method described there lies in the fact that for detection of the current space phasor the detection of at least two phase currents using expensive phase current sensors, e.g. transfo-shunts, is necessary.

The aim of the invention is to create a method of the type mentioned above, which on the one hand avoids the mentioned disadvantages, and on the other hand guarantees a better and more precise control of the machine.

The method according to the invention is characterised by the fact that in asynchronous machines the flow direction required for field- and rotor-oriented control, and in synchronous machines the rotor position are measured using the spatial magnetic conductivity fluctuations in the machine, whereby the conductivity fluctuations are detected using the parameters for the D.C. link, and in particular the D.C. link current and/or D.C. link voltage, and using the actual switching state of the inverter, and by the fact that this is followed by a mathematical evaluation. With this invention, it is for the first time possible to create a method for high-precision control of three-phase machines without a mechanical transducer, such as a position sensor or tachogenerator, which will work under any operating conditions, including low speeds and idle, whereby only parameters of the D.C. link such as D.C. link current or D.C. link voltage are measured. Thereby, using the actual inverter switching state, the ratio of phase current increases to the resulting voltages is determined, which corresponds with the flux or rotor position of the three-phase machine.

SUMMARY OF THE INVENTION

The basic idea is to detect the described conductivity fluctuations by measuring the current increases in the machine phases. The method according to the invention avoids expensive current sensors, since it does not require the full space phasor information, but only the projections of the current increase space phasor and the corresponding voltage space phasor on the motor phase axes. The ratio of these parameters (referred to as y with index of phase name) is proportional to the actual local magnetic conductivity in the relevant phase axis, and fluctuates with the double rotor or flux axis position. In accordance with the invention, a measurement of the increase in D.C. link current using the actual inverter switching state is used for detection of the phase current increases instead of a measurement of the phase current increases. Thereby, the inverter serves as an intelligent measuring point change-over switch that applies the different motor phases to the D.C. link current measuring module depending on the inverter state. Thereby, the operational inverter states—the machine control is not affected by the measurement—or forced inverter states—the machine control is affected by the measurement—can be used. If, for example, positive D.C. link voltage is applied to the inverter branch connected to phase U in a three-phase inverter, and negative D.C. link voltage is applied to the inverter branches connected to V and W, the phase current of phase U will necessarily flow in the D.C. link, and therefore this phase current will be detected via the D.C. link. At the same time, however, it is known that in this inverter combination the voltage space phasor applied to the machine points in the direction of phase U, so that the mentioned ratio of the projections of the current increase space phasor—in the mentioned case, this is the current increase in phase U—and the corresponding voltage space phasor—in this case the voltage space phasor in phase direction U—can be established on the motor phase axes. Therefore, yu is established.

By means of a three-phase inverter and a three-phase machine, the mentioned ratios can therefore be established via six inverter states in the directions U, −U, V, −V, W, −W.

In accordance with a special feature of the invention, at least two measurements of the increase in D.C. link current are carried out, and the measured values of the two increases are entered into the stator voltage equations and linked mathematically. An important advantage of this method according to the invention is the fact that the same measuring module is always used, so that errors of measurement due to component leakage, etc., are compensated by the combination of several measurements and thus do not affect the result. With this embodiment of the invention with the combination of two measurements, the EMC can be eliminated and the conductivity measurement is therefore independent of speed. This is not possible in measurement of the current space phasor for at least two phase currents, since the involved current sensors have different errors of measurement that affect the result.

In accordance with a further embodiment of the invention, at least two conductivity measurements are carried out in spatially separate directions, and the angle $\gamma$ is calculated according to the known rules of calculation. If an induced voltage (EMC) occurs in the stator winding due to a turning rotor, the ratio y will be affected by the EMC. In order to eliminate this influence, two current increase measurements are combined and instead of the voltages the differences in voltage and instead of the current increases the differences in current increases between the two measurements that are to be combined are used. This is shown by writing down the stator voltage equations for the two measurements to be combined, and subtraction of the two equations. Since the EMC appears additively on the right-hand side of the equation, it is eliminated by the subtraction. The mathematical evidence can be found in VDI Progress Reports, Series 21, No. 117, VDI-Verlag, Düsseldorf 1992, "Sensorless Control of A.C. Machines" by M. Schrödl. As a result, the detection of conductivity fluctuations is independent of speed. Since the actual rotor or flux position angle cannot be concluded accurately from one conductivity measurement, at least two conductivity measurements in spatially different directions are combined. Thus, when linear, independent conductivity measurements A, B, C are available with the corresponding model equations for the conductivity fluctuations $$yA = y\text{mean} + \Delta y \cos(2\gamma A - 2\gamma)$$

$$yB = y\text{mean} + \Delta y \cos(2\gamma B - 2\gamma)$$

$$yC = y\text{mean} + \Delta y \cos(2\gamma C - 2\gamma)$$

which correspond with the double differential angle between the voltage difference space phasor $\gamma A$ etc., and the direction of the conductivity maximum $\gamma$, which corresponds with the rotor position or flux direction according to the above descriptions, depending on the type of machine, the parameter ymean (mean conductivity) and $\Delta y$ (conductivity fluctuation) can be eliminated and the angle $\gamma$ calculated using known rules of calculation.

In accordance with another special feature of the invention, the conductivity values detected by means of measurement are detected at different D.C. link voltages with sufficient accuracy. A D.C. link voltage detection is not necessary, if the combined conductivity measurements were carried out at more or less the same D.C. link voltage, since the parameter for voltage in the above equations then presents a constant factor that is the same in every equation and is therefore eliminated when calculating the angle $\gamma$. The angle $\gamma$ is the basis of the known field- or rotor-oriented control for the independent setting of flux and torque in three-phase machines, whereby this control is also possible at low speeds and standstill when using the method according to the invention for rotor or flux position without a rotor position sensor or tachogenerator.

According to a further feature of the invention, speed- and/or load-dependent correction functions, preferably linear, in the form:

$$\gamma(\text{corrected}) = \gamma + \Delta\gamma(\text{speed, load})$$

are carried out in the mathematical calculation. Speed- and load-dependent influences on the conductivity curve can be taken into account by means of speed- and load-dependent, preferably linear correction functions in the above forms in order to improve accuracy, whereby the correction functions using a reference model, for example a flux model according to the state of the art in asynchronous machines, or a reference transducer, for example rotation angle measurement in synchronous machines, are determined once per type of machine.

In accordance with a further feature of the invention, the determined flux or rotor position angle is used as an input parameter in a machine model for on-line control of the three-phase machine. Thus, the application of this method according to the invention is clearly guaranteed in terms of function.

According to an aspect of the present invention, a method for regulating a three-phase machine functioning under any operational conditions without a mechanical rotary transducer, which is supplied with D.C. power by an inverter, and where parameters of a D.C. link using an actual switching state of the inverter are detected for regulation is provided. The method comprises measuring one of (1) flow direction required for field-oriented control in asynchronous machines, and (2) rotor position for rotor-oriented control in synchronous machines, by using spatial magnetic conductivity fluctuations in the machine, whereby the conductivity fluctuations are detected using parameters for a D.C. link. Also included in the method is the use of using an actual switching state of an inverter. Mathematical evaluation to calculate one of flow direction or rotor direction is then performed.

According to another aspect of the present invention, the machine is one of an asynchronous and synchronous machine. In another aspect of the invention, the method further includes detecting the conductivity fluctuations using parameters for at least one of D.C. link current and D.C. link voltage. In another aspect of the present invention, the method includes carrying out at least two measurements of an increase in D.C. link current; and entering the at least two values from the measurements into stator voltage equations and linking the measurements mathematically.

In another aspect of the present invention, the at least two conductivity measurements are carried out in spatially separate directions, and the values are introduced into the following equations:

$$yA = y\text{mean} + \Delta\gamma \cos(2\gamma A - 2\gamma)$$

$$yB = y\text{mean} + \Delta\gamma \cos(2\gamma B - 2\gamma)$$

$$yC = y\text{mean} + \Delta\gamma \cos(2\gamma C - 2\gamma)$$

wherein the angle $\gamma$ is calculated.

According to a further aspect of the present invention, the method includes conductivity values detected by measurement are detected at different D.C. link voltages with sufficient accuracy. In another aspect of the present invention, at least one of speed-dependent and load-dependent correction functions are carried out in a linear mathematical calculation defined by γ(corrected)=γ+Δγ(speed, load). According to still a further aspect of the present invention, the method includes using one of a determined flux or rotor position angle as an input parameter in a machine model for on-line control of a three-phase machine.

In another aspect of the invention, a method for regulating a three-phase machine functioning under any operational conditions without a mechanical rotary transducer, which is supplied with D.C. power by an inverter, and where parameters of a D.C. link using an actual switching state of the inverter are detected for regulation is provided. The method includes, measuring at least one of (1) flow direction required for field-oriented control in asynchronous machines, and (2) the rotor position for rotor-oriented control in synchronous machines, by using spatial magnetic conductivity fluctuations in the machine. The conductivity fluctuations are detected using parameters for a D.C. link; using an actual switching state of an inverter; and performing a mathematical evaluation to calculate the flow direction or rotor direction, wherein the at least two conductivity measurements are carried out in spatially separate directions, and the values introduced into the following equations:

$$yA = y\text{mean} + \Delta y \cos(2\gamma A - 2\gamma)$$

$$yB = y\text{mean} + \Delta y \cos(2\gamma B - 2\gamma)$$

$$yC = y\text{mean} + \Delta y \cos(2\gamma C - 2\gamma)$$

wherein the angle γ is calculated.

BRIEF DESCRIPTION OF THE PRESENT INVENTION

The invention is explained in more detail on the basis of the embodiment illustrated in the FIGURE.

The FIGURE shows the control of a three-phase machine in a schematic diagram.

DETAILED DESCRIPTION OF THE PRESENT INVENTION

In accordance with the FIGURE, an inverter 1 is supplied by a one- or three-phase A.C. power system at the optional A.C. input 2. The D.C. side 3 is connected to the converter 4, which has the semiconductor valves 5, by the D.C. link zk. The D.C. link voltage Uzk of the measuring and control unit 7 is fed by a capacitor 6. Moreover, the D.C. link current Izk of the measuring and control unit 7 is also fed by the resistor R. The actual switching state of the inverter I is also detected by the measuring and control unit 7. The three-phase machine 8 to be regulated is connected on the bridge circuit of the semiconductor valves 5. The converter 4 is controlled by means of the control signals 9 calculated by the measuring and control unit 7.

In conclusion, it is noted that in the various described embodiments the same parts are allocated the same reference numbers and the same component names, whereby the disclosures contained throughout the description can be applied by analogy to the same parts with the same reference numbers or same component names. Furthermore, positions details given in the description, e.g. top, bottom, side, etc., relate to the figure being described and illustrated at the time and with a change of position should be transferred accordingly to the new position. Moreover, individual features or combinations of features from the different embodiments illustrated and described can represent independent inventive solutions or solutions according to the invention in themselves.

The problem forming the basis of the separate solutions according to the invention can be taken from the description.

For form's sake, it is noted that for a better understanding of the structure of the control, the components are illustrated partly untrue to scale and/or are enlarged and/or made smaller.

What is claimed is:

1. A method for regulating, without a mechanical rotary transducer, a three-phase machine, which, functioning under any operational conditions, is supplied with D.C. power by an inverter through a D.C. link, the method comprising:

detecting parameters of the D.C. link related to spatial magnetic conductivity fluctuations of the machine;

monitoring an actual switching state of the inverter; and calculating at least one of (1) flux direction required for field-oriented control in asynchronous machines, and (2) the rotor position for rotor-oriented control in synchronous machines from the detected parameters of the D.C. link and the actual switching state of the inverter, wherein at least one of speed-dependent and load-dependent correction functions are carried out in a mathematical calculation defined by γ(corrected)=γ+Δγ (speed, load).

2. The method of claim 1, wherein said machine is one of a synchronous and an asynchronous machine.

3. The method of claim 1, whereby the conductivity fluctuations are detected using parameters for at least one of D.C. link current and D.C. link voltage.

4. The method of claim 1, further comprising carrying out at least two measurements of an increase in D.C. link current; and entering the at least two values from the measurements into stator voltage equations and linking the measurements mathematically.

5. The method of claim 1, wherein conductivity values detected by measurement are detected at different D.C. link voltages with sufficient accuracy.

6. The method according to claim 1, further comprising using one of a determined flux or rotor position angle as an input parameter in a machine model for on-line control of a three-phase machine.

7. A method for regulating, without a mechanical rotary transducer, a three-phase machine, which, functioning under any operational conditions, is supplied with D.C. power by an inverter through a D.C. link, the method comprising:

detecting parameters of the D.C. link related to spatial magnetic conductivity fluctuations of the machine;

monitoring an actual switching state of the inverter; and calculating at least one of (1) flux direction required for field-oriented control in asynchronous machines, and (2) the rotor position for rotor-oriented control in synchronous machines from the detected parameters of the D.C. link and the actual switching state of the inverter, wherein the at least two conductivity measurements are carried out in spatially separate directions, and the values introduced into the following equations:

$$yA = y\text{mean} + \Delta y \cos(2\gamma A - 2\gamma)$$

$$yB = y\text{mean} + \Delta y \cos(2\gamma B - 2\gamma)$$

$$yC = y\text{mean} + \Delta y\, \cos(2\gamma C - 2\gamma)$$

wherein the angle γ is calculated.

8. The method of claim 7, wherein at least one of speed-dependent and load-dependent correction functions are carried out in a linear mathematical calculation defined by γ(corrected)=γ+Δγ(speed, load).

9. A method for regulating, without a mechanical rotary transducer, a three-phase machine, which, functioning under any operational conditions, is supplied with D.C. power by an inverter through a D.C. link, comprising:

measuring at least one of (1) flux direction required for field-oriented control in asynchronous machines, and (2) the rotor position for rotor-oriented control in synchronous machines by using spatial magnetic conductivity fluctuations in the machine, whereby the conductivity fluctuations are detected using parameters for the D.C. link;

monitoring an actual switching state of the inverter; and performing a mathematical evaluation to calculate the flux direction or rotor direction, wherein the at least two conductivity measurements are carried out in spatially separate directions, and the values are introduced into the following equations:

$$yA = y\text{mean} + \Delta y\, \cos(2\gamma A - 2\gamma)$$

$$yB = y\text{mean} + \Delta y\, \cos(2\gamma B - 2\gamma)$$

$$yC = y\text{mean} + \Delta y\, \cos(2\gamma C - 2\gamma)$$

wherein the angle γ is calculated.

* * * * *